(12) United States Patent
Motoki et al.

(10) Patent No.: US 9,696,778 B2
(45) Date of Patent: Jul. 4, 2017

(54) POWER DELIVERY DEVICE AND CONTROL METHOD OF THE SAME

(71) Applicant: ROHM CO., LTD., Kyoto (JP)

(72) Inventors: Kenichi Motoki, Kyoto (JP); Manabu Miyata, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 558 days.

(21) Appl. No.: 14/302,577

(22) Filed: Jun. 12, 2014

(65) Prior Publication Data
US 2014/0369085 A1    Dec. 18, 2014

(30) Foreign Application Priority Data

Jun. 14, 2013    (JP) .................. 2013-125300

(51) Int. Cl.
| | | |
|---|---|---|
| G06F 1/26 | (2006.01) | |
| H02J 1/06 | (2006.01) | |
| H04L 12/64 | (2006.01) | |
| G06F 1/24 | (2006.01) | |
| H02M 1/32 | (2007.01) | |

(52) U.S. Cl.
CPC .............. G06F 1/266 (2013.01); G06F 1/24 (2013.01); H02J 1/06 (2013.01); H04L 12/6418 (2013.01); *H02M 2001/322* (2013.01); *Y10T 307/766* (2015.04)

(58) Field of Classification Search
CPC   G06F 1/26; G06F 1/266; H02M 1/36; H02M 3/33507
See application file for complete search history.

(56) References Cited

U.S. PATENT DOCUMENTS

| | | | |
|---|---|---|---|
| 2012/0113685 A1* | 5/2012 | Inukai | ............... H02M 1/36 363/21.01 |
| 2012/0313571 A1 | 12/2012 | Knowlton | |
| 2015/0052390 A1* | 2/2015 | Dryer | ............... G06F 1/30 714/14 |

FOREIGN PATENT DOCUMENTS

| | | |
|---|---|---|
| JP | 2005149293 A | 6/2005 |
| JP | 2006065616 A | 3/2006 |
| JP | 2011082802 A | 4/2011 |
| JP | 2012123673 A | 6/2012 |

OTHER PUBLICATIONS

"Special Edition: Power Delivery through Data Line", Nikkei Electronics, Oct. 9, 2012, pp. 23-40, with English Translation.
JPO Notification of Reasons for Refusal corresponding to JP Application No. 2013-125300; Mailing date of Apr. 25, 2017.

* cited by examiner

*Primary Examiner* — Jeffrey Shin
(74) *Attorney, Agent, or Firm* — Cantor Colburn LLP

(57) ABSTRACT

There can be provided a power delivery (PD) device capable of achieving protocols, e.g. Hard Reset, without using any alternative power source, and a control method of thereof. The PD device includes: a power source; a power line configured to deliver power supplied from the power source, to an outside; a switch connected between the power source and the power line; and a control circuit connected to the power line so that power is supplied from the power source to the control circuit, wherein at the time when a Hard Reset protocol is received from the outside through the power line, the control circuit turns from ON to OFF the switch to disconnect the power line from the power source.

20 Claims, 6 Drawing Sheets

POWER DELIVERY DEVICE AND CONTROL METHOD OF THE SAME

CROSS REFERENCE TO RELATED APPLICATIONS

This application is based upon and claims the benefit of priority from prior Japanese Patent Application No. P2013-125300 filed on Jun. 14, 2013, the entire contents of which are incorporated herein by reference.

FIELD

An embodiment described herein relates to a power delivery (PD) device and a control method of such a PD device.

BACKGROUND

Conventionally, there have been provided direct current (DC) power sockets which can intercommunicate between terminal devices and power line carrier communication networks supporting telecommunications standards with the PD.

There are Power over Ethernet (PoE) technology and Universal Serial Bus (USB) technology as a PD technology using data lines.

As the USB technologies, there are USB 2.0 Standard up to maximum supply power of 2.5 W, USB 3.0 Standard up to maximum supply power of 4.5 W, and Battery Charging Standard (BCS) Revision 1.2 up to maximum supply power of 7.5 W according to the PD level.

Moreover, a USB Power Delivery (USB-PD) Specification Revision 1.0 is compatible with existing cables and existing connectors, and coexists also with the USB 2.0 Standard, the USB 3.0 Standard, and the USB-BCS Revision 1.2. In such a specification, values of the charging current and voltage is selectable within a range of voltage 5V-12V-20V and a range of current 1.5 A-2 A-3 A-5 A, and the USB electric charging and power transmission can be achieved to be 10 W, 18 W, 36 W, 65 W, and the maximum of 100 W.

DC/DC converters have been used as a power source for achieving such a PD. There are a diode rectification system and a synchronous rectification method in the DC/DC converters.

SUMMARY

The embodiment provides a PD device capable of achieving protocols, e.g. Hard Reset, without using any alternative power source, and a control method of such a PD device.

According to one aspect of the embodiment, there is provided a PD device comprising: a power source; a power line configured to deliver power supplied from the power source, to an outside; a switch connected between the power source and the power line; and a control circuit connected to the power line so that power is supplied from the power source to the control circuit, wherein at the time when a Hard Reset protocol is received from the outside through the power line, the control circuit turns from ON to OFF the switch to disconnect the power line from the power source.

According to another aspect of the embodiment, there is provided a control method of a PD device, the PD device comprising: a power source; a power line configured to deliver power supplied from the power source, to an outside; a switch connected between the power source and the power line; and a control circuit connected to the power line so that power is supplied from the power source to the control circuit, the control circuit configured to control the PD device, the control method comprising: turning from ON to OFF the switch to disconnect the power line from the power source, at the time when a Hard Reset protocol is received from the outside through the power line; and reducing a voltage of the power line up to a first target voltage value, after turning from ON to OFF the switch.

According to the embodiment, there can be provided the PD device capable of achieving protocols, e.g. Hard Reset, without using any alternative power source, and the control method of such a PD device.

DESCRIPTION OF EMBODIMENTS

Figure 1:
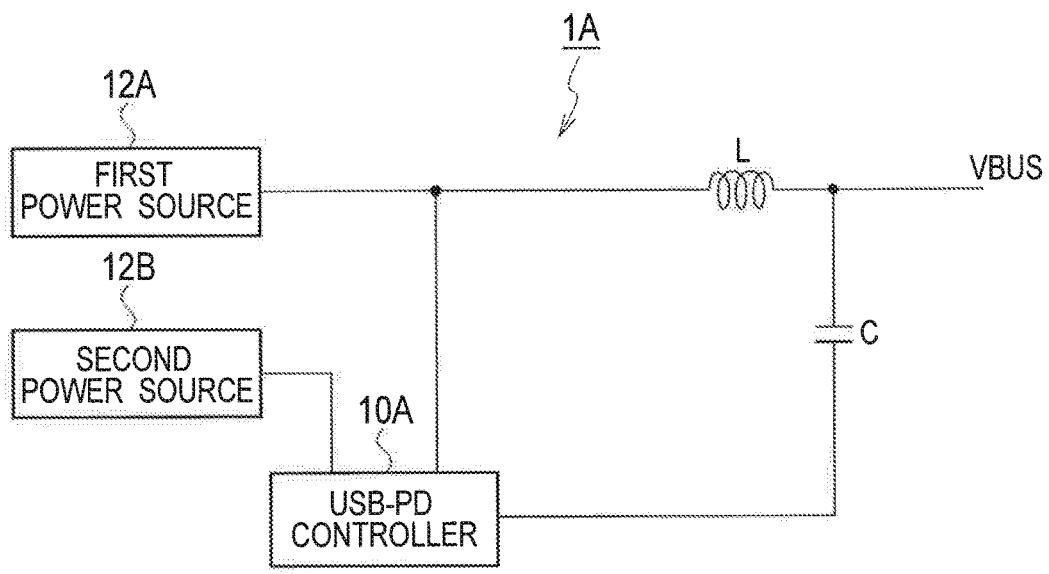
FIG. 1 is a schematic circuit block configuration diagram showing a PD device according to a comparative example.

Next, the embodiment will be described with reference to drawings. In the description of the following drawings, the identical or similar reference numeral is attached to the identical or similar part. However, it should be known about that the drawings are schematic and the relation between thickness and the plane size and the ratio of the thickness of each layer differs from an actual thing. Therefore, detailed thickness and size should be determined in consideration of the following explanation. Of course, the part from which the relation and ratio of a mutual size differ also in mutually drawings is included.

Moreover, the embodiment shown hereinafter exemplifies the apparatus and method for materializing the technical idea; and the embodiment does not specify the material, shape, structure, placement, etc. of each component part as the following. The embodiment may be changed without departing from the spirit or scope of claims.

EMBODIMENT (PD Device According to Comparative Example)

As shown in FIG. 1, a schematic circuit block configuration of a PD device 1A according to a comparative example includes: a first power source 12A; an inductance L connected between the first power source 12A and a power line VBUS for PD; a USB-PD controller 10A connected to the power line VBUS through a capacitor C, the USB-PD controller 10A configured to control a PD etc.; and an second power source 12B different from the first power source 12A. The PD device 1A according to the comparative example functions as a variable source including a communication facility since the USB-PD controller 10A is connected to the power line VBUS through the capacitor C.

Figure 2:
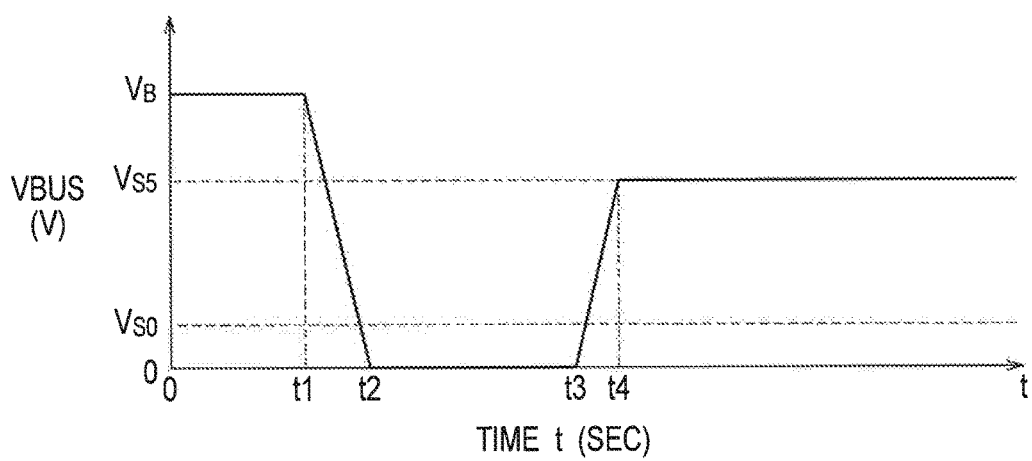
FIG. 2 is a schematic diagram for explaining voltage transition of a power line (VBUS) during a Hard Reset.

At the time when a Hard Reset protocol is received from peripheral devices etc. connected to the PD device 1, for example, it is necessary to once reduce the voltage value of the power line VBUS up to 0V (more specifically, not more than voltage $V_{S0}$ shown in FIG. 2), and then to restore the voltage value of the power line VBUS up to 5V (e.g. voltage $V_{S5}$ shown in FIG. 2) which is an initial voltage value, after the Hard Reset is completed, in the PD device 1A according to the comparative example composed in this way. In the case where such an operation is executed after the Hard Reset is completed, it is necessary to also reduce an output voltage of the first power source 12A to 0V in order to reduce the voltage of power line VBUS up to 0V. However, as a result, since the power supplied to the USB-PD controller 10A is also interrupted, it becomes impossible to maintain operation of the USB-PD controller 10A. Accordingly, the alternative second power source 12B different from the first power source 12A is arranged, and thereby the power can be supplied to the USB-PD controller 10A from the second power source 12B during the Hard Reset processing.

In the case of using the PD device 1A according to the comparative example in apparatuses having several power source systems, it is not difficult to use such an alternative power source of different system. However, for example, since power units, e.g. AC adapters, generally have only a single power source (such as the first power source 12A) in order to achieve the Hard Reset protocol, it is necessary to prepare a new power source (such as the second power source 12B). Accordingly, there is a problem of increasing the size and cost of the PD device 1A.

(PD Device According to Embodiment)

Figure 3:
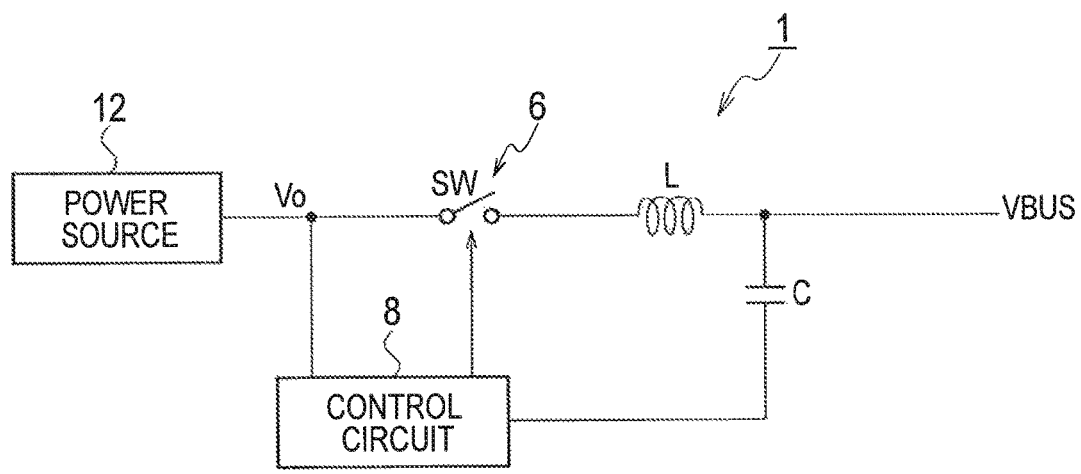
FIG. 3 is a schematic circuit block configuration diagram showing an example of a PD device according to an embodiment.

As shown in FIG. 3, a schematic circuit block configuration of a PD device 1 according to an embodiment includes: a power source 12; a power line VBUS configured to deliver power supplied from the power source 12, to the outside; a switch 6 connected to between the power source 12 and the power lines VBUS; and a control circuit 8 connected to the power line VBUS through a capacitor C so that power is supplied from the power source 12 to the control circuit 8, wherein at the time when a Hard Reset protocol is received from the outside through the power line VBUS, the control circuit 8 turns from ON to OFF the switch 6 to disconnect the power line VBUS from the power source 12. Also the PD device 1 according to the embodiment functions as a variable source including a communication facility since the USB-PD controller 10 is connected to the power line VBUS through the capacitor C.

More specifically as shown in FIG. 3, a schematic circuit block configuration of the PD device 1 according to the embodiment includes: the power source 12 configured to supply power to each of the power line VBUS and the control circuit 8; the inductance L connected between the power source 12 and the power line VBUS for power supply; a control circuit 8 connected to the power line VBUS through the capacitor C, the control circuit 8 configured to control a PD etc.; and the switch 6 (SW) connected between the power source 12 and the inductances L. The PD device 1 according to the embodiment is used as PD devices for a PD using data lines, e.g. PoE, USB, and the like.

Figure 5:
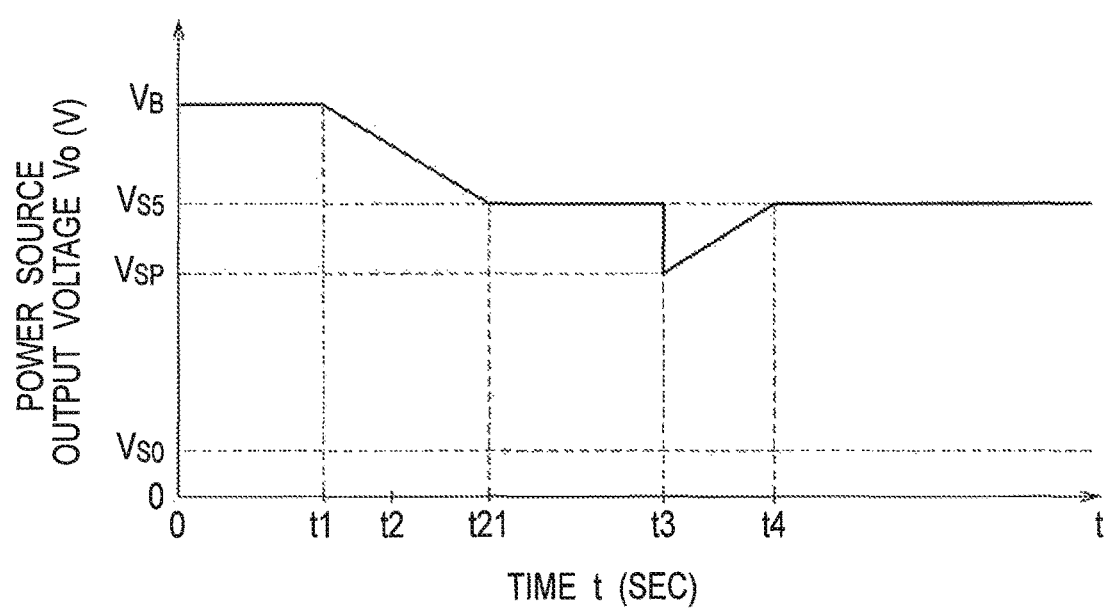
FIG. 5 is a schematic diagram for explaining power source output voltage transition during the Hard Reset, corresponding to the schematic diagram showing in FIG. 2.

At the time when the Hard Reset protocol is received from peripheral devices etc. connected to the PD device 1, for example, it is necessary to once reduce the voltage value of the power line VBUS from voltage $V_B$ to 0V (more specifically, not more than voltage $V_{S0}$ shown in FIG. 2), and then to restore the voltage value of the power line VBUS up to 5V (e.g. voltage $V_{S5}$ shown in FIG. 2) which is an initial voltage value, after the Hard Reset is completed, in the PD device 1 according to the embodiment composed in this way. At the time of executing such an operation, the control circuit 8 controls the switch 6 to be turned OFF (disconnects the power line VBUS from the power source 12), and thereby the power only supplied to the power line VBUS from the power source 12 can be interrupted without dropping the voltage of the control circuit 8 up to 0V. On the other hand, the power supplied from the power source 12 to the control circuit 8 can be continued regardless of turning ON/OFF (open/close) of the switch 6, as shown in FIG. 5 described later.

Thus, according to the PD device 1 according to the embodiment, the power only supplied to the power line VBUS from the power source 12 is interrupted, and the power supplied to the control circuit 8 from the power source 12 is not interrupted, during the Hard Reset. Accordingly, since it is not necessary to prepare/use any alternative power source of different system (e.g. the second power source 12B different from the first power source 12A), etc. as the comparative example, thereby preventing increase in the size and cost of the PD device.

(Anther PD Device According to Embodiment)

Figure 4:
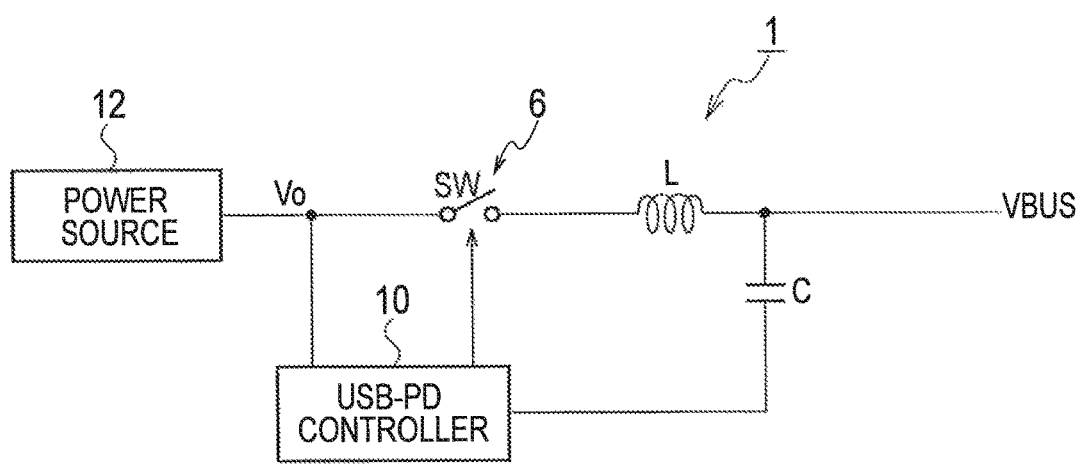
FIG. 4 is a schematic circuit block configuration diagram showing an example of another PD device according to the embodiment.

FIG. 4 illustrates another example of another PD device 1 according to the embodiment. Another PD device 1 includes a USB-PD controller 10 instead of the control circuit 8 in the PD device 1 shown in FIG. 3. At the time when the Hard Reset protocol is received from peripheral devices etc. connected to the PD device 1, the USB-PD controller 10 controls the switch 6 to be turned OFF (disconnects the power line VBUS from the power source 12), thereby, the power only supplied to the power line VBUS from the power source 12 can be interrupted without dropping the voltage of the USB-PD controller 10 up to 0V, in another PD device according to the embodiment shown in FIG. 4. On the other hand, the power supplied from the power source 12 to the control circuit 8 can be continued regardless of turning ON/OFF (open/close) of the switch 6, as shown in FIG. 5 described later.

According to the PD device 1 shown in FIG. 4, the power only supplied to the power line VBUS from the power source 12 is interrupted, and the power supplied to the USB-PD controller 10 from the power source 12 is not interrupted, also during the Hard Reset executed in the PD device based on the USB-PD specification. Accordingly, since it is not necessary to prepare/use any alternative power source of different system (e.g. the second power source 12B different from the first power source 12A), etc. as the comparative example, thereby preventing increase in the size and cost of the PD device.

(Power Source)

Figure 6:
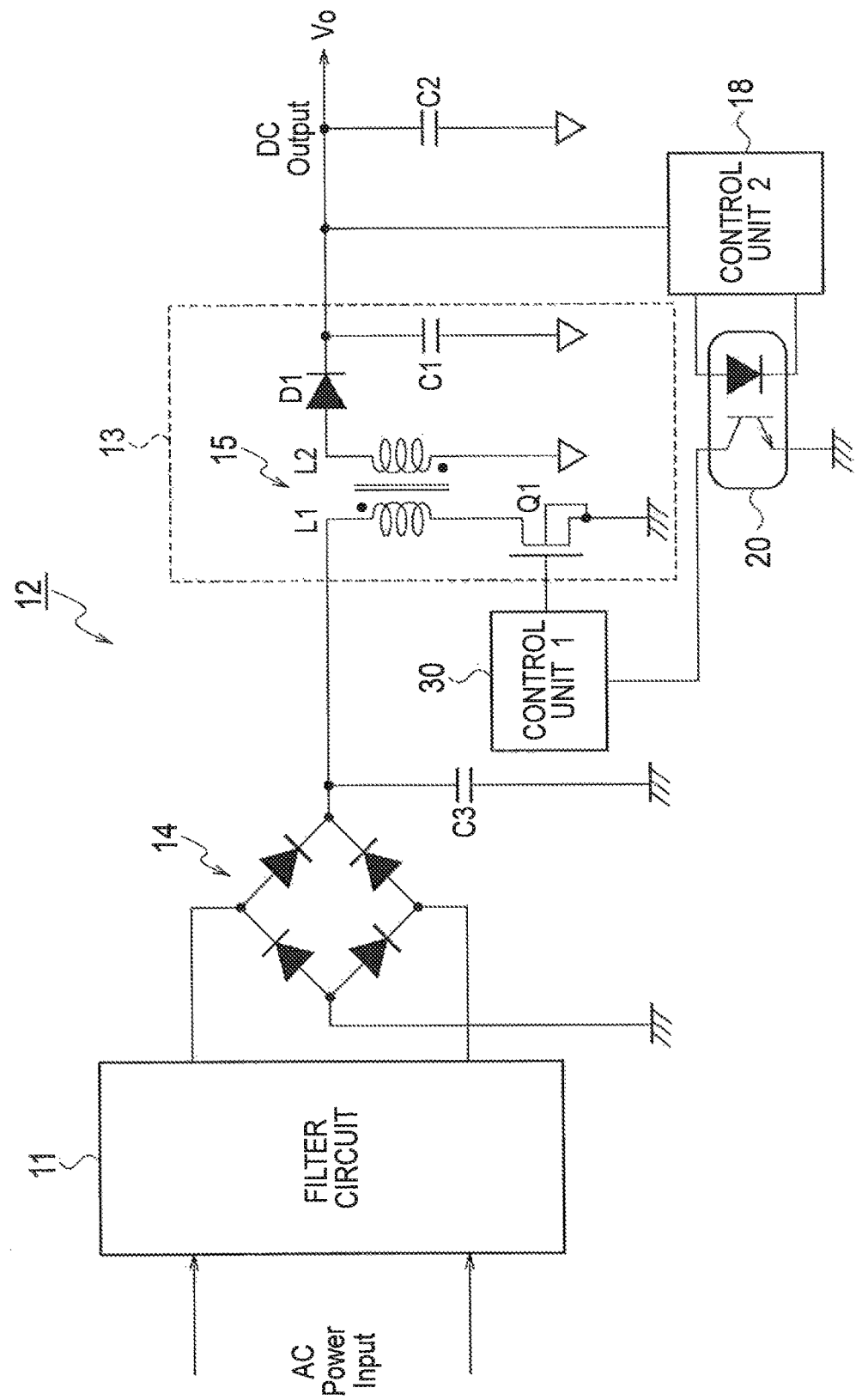
FIG. 6 is a schematic circuit block configuration diagram showing an example of a power source applicable to the PD device according to the embodiment.

As shown in FIG. 6, the power source 12 applicable to the PD device 1 according to the embodiment includes: a DC/DC converter 13 disposed between an AC input and a DC output, the DC/DC converter 13 composed of a transformer 15, a diode D1, a capacitor C1, and a MOS transistor Q1, the MOS transistor Q1 connected in series between a primary-side inductance L1 of the transformer 15 and a ground potential; a control unit 1 (reference numeral 30) configured to control the MOS transistor Q1; an AC/DC converter connected between the AC input and the control unit 1 (reference numeral 30), the AC/DC converter configured to supply power to the control unit 1 (reference numeral 30); a control unit 2 (reference numeral 18) for error compensation connected between the output of the DC/DC converter 13 and the DC output; and an insulation circuit 20 connected to the control unit 2 (reference numeral 18), the insulation circuit 20 configured to feed back output information to the control unit 1 (reference numeral 30).

As shown in FIG. 6, the AC/DC converter is connected to the AC input and is composed of a filter circuit 11, a diode rectification bridge 14, etc.

The DC/DC converter 13 is configured to have the diode rectification system, and a capacitor C3 is connected between the DC input line and the ground potential, and a capacitor C2 is connected between the DC output line and the ground potential.

A capacitor, a photo coupler, a transformer, etc. is applicable to the insulation circuit 20. As usage, a bidirectional transformer having an insulated driver, a bilateral device, etc. may also be applied thereto.

(Detailed Constructional Example of PD Device)

Figure 7:
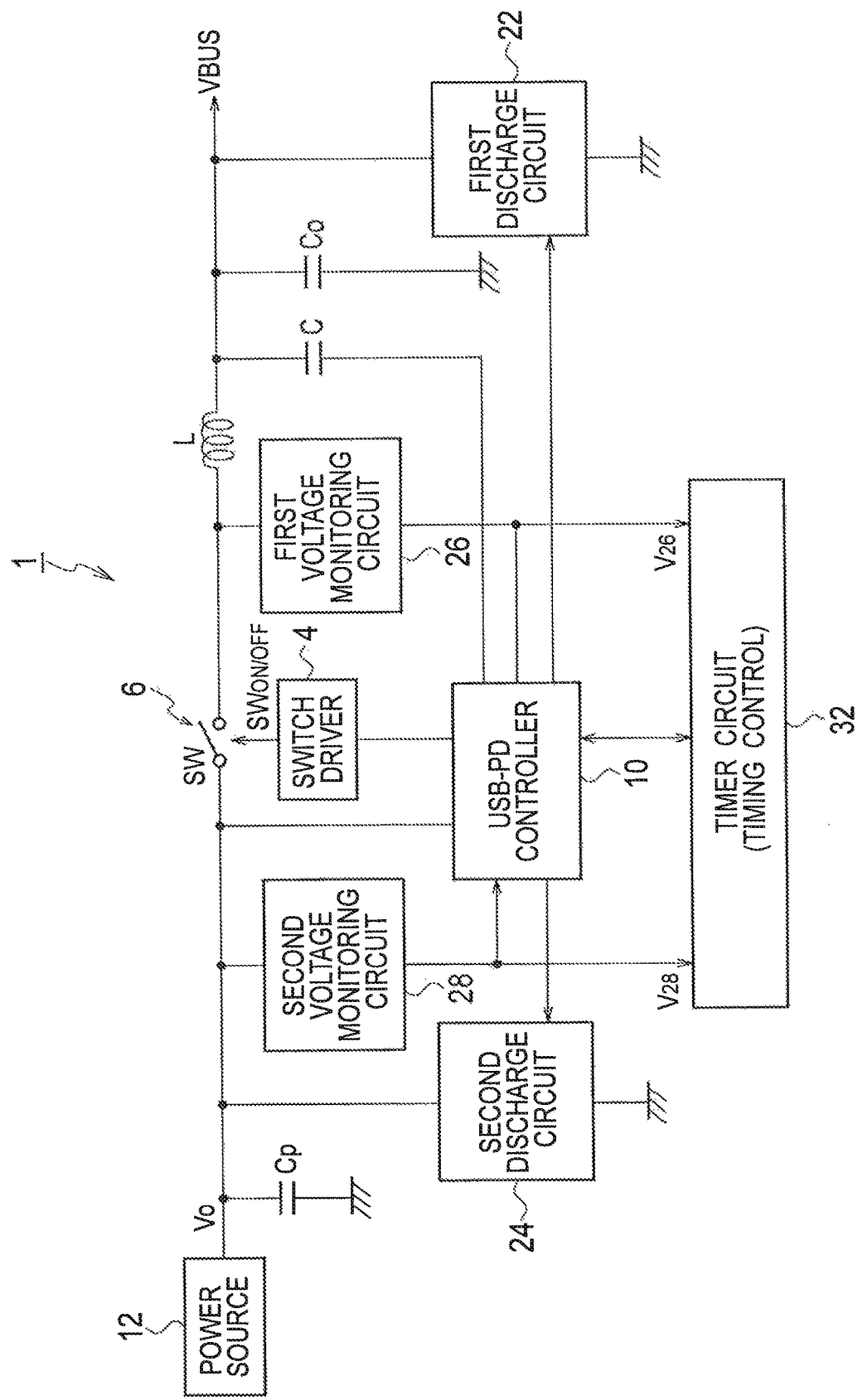
FIG. 7 is a schematic circuit block configuration diagram showing the PD device shown in FIG. 5 further embodied.

As shown in FIG. 7, a detailed constructional example of the PD device 1 according to the embodiment includes: not only the power source 12, the power line VBUS, the USB-PD controller 10, the LC circuit, and the switch 6 each shown in FIG. 4; but also a switch driver 4 configured to execute ON/OFF operation of the switch 6; a first discharge circuit 22 configured to reduce the voltage of the power line VBUS; a second discharge circuit 24 configured to reduce the output voltage of the power source 12; a first voltage monitoring circuit 26 configured to monitor a voltage value of the power line VBUS; a second voltage monitoring circuit 28 configured to monitor an output voltage value of the power source 12; and a timer circuit 32 configured to control timing of the ON/OFF operation of the switch 6. The capacitor $C_P$ denotes an output capacitor of the power source 12, and the capacitor $C_O$ denotes an output capacitor of the VBUS line.

Even if omitting both of or any one of the first voltage monitoring circuit 26 and the second voltage monitoring circuit 28, the control method of the PD device 1 according to the embodiment can also be achieved using only the timing controlled by the timer circuit 32 described later.

Alternatively, a part or all of each element composing the PD device 1 illustrated to FIG. 7 may also be integrated with a part or all of other elements to be formed as an integrated circuit (IC). For example, a part of the power sources 12 (e.g. functional part for varying the output voltage) may also be integrated with the second voltage monitoring circuit 28 to be formed as an IC.

Moreover, the second discharge circuit 24 may be built in the power source 12 or in the second voltage monitoring circuit 28. Moreover, the timer circuit 32 may be built in the USB-PD controller 10.

Alternatively, the second voltage monitoring circuit 28 and the switch 6 may be composed as a discrete part, and an IC form of the other parts may also be integrated into the USB-PD controller 10 to be formed as an IC.

(Control Method of PD Device)

Figure 8:
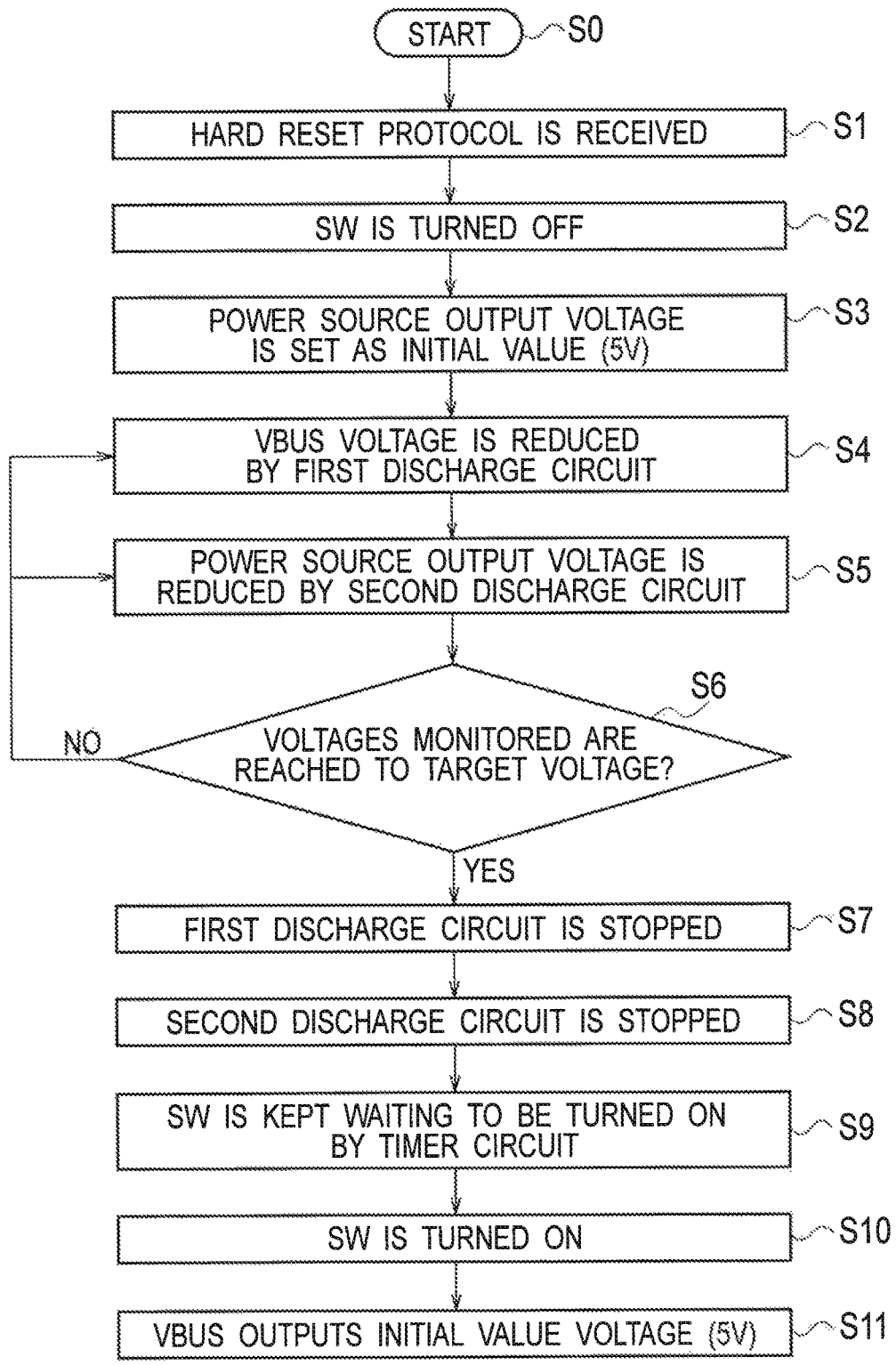
FIG. 8 is an outline flowchart for explaining an example of a control method of the PD device according to the embodiment.

As shown in FIG. 8, an example of the control method of PD device 1 according to the embodiment is started from Step S0.

When the Hard Reset protocol is received in Step S1, the USB-PD controller 10 controls the switch driver 4 so that the switch 6 becomes turned OFF, in Step S2. In response to the above control, the switch driver 4 transmits a signal $SW_{OFF}$ for turning OFF the switch 6, to the switch 6. As a consequence, the switch 6 is turned OFF, thereby interrupting the power supplied to the power line VBUS from the power source 12.

In Step S3, the USB-PD controller 10 sets the output voltage value from the power source 12 as a voltage value ($V_{S5}$ in this example) which is an initial value.

In Step S4, the USB-PD controller 10 controls the first discharge circuit 22 to reduce the voltage of the power line VBUS. In response to the above control, the first discharge circuit 22 begins to reduce the voltage of the power line VBUS (at time t1 shown in FIG. 2).

In Step S5, the USB-PD controller 10 controls the second discharge circuit 24 to reduce the output voltage of the power source 12. In response to the above control, the second discharge circuit 24 begins to reduce the voltage of the output voltage of the power source 12 (at time t1 shown in FIG. 5).

The first voltage monitoring circuit 26 monitors the voltage value of the power line VBUS, and reports the voltage value of the power line VBUS as a measured value signal $V_{26}$ to each of the USB-PD controller 10 and the timer circuit 32 one after another. Similarly, the second voltage monitoring circuit 28 monitors the output voltage value of the power source 12, and reports the output voltage value of the power source 12 as a measured value signal $V_{28}$ to each of the USB-PD controller 10 and the timer circuit 32 one after another.

In Step S6, the USB-PD controller 10 determines whether the voltage value of the power line VBUS and the output voltage value of the power source 12 are respectively reached to target voltage values, on the basis of the measured value signals $V_{26}$ and $V_{28}$ respectively transmitted from the first voltage monitoring circuit 26 and the second voltage monitoring circuit 28.

As a result of the determination executed in Step S6, if the value of the measured value signal $V_{26}$ transmitted from the first voltage monitoring circuit 26 is not reached the target voltage value (not more than the voltage $V_{S0}$), the USB-PD controller 10 returns the processing to Step S4. Conversely, as a result of determination executed in Step S6, if the value of the measured value signal $V_{26}$ transmitted from the first voltage monitoring circuit 26 is reached to the target voltage value (not more than the voltage $V_{S0}$ in this case), the USB-PD controller 10 controls the first discharge circuit 22 to stop the reduction in the voltage of the power line VBUS in Step S7. In response to the above control, the first discharge circuit 22 stops the reduction in the voltage of the power line VBUS (at time t2 shown in FIG. 2).

On the other hand, as a result of the determination executed in Step S6, if the value of the measured value signal $V_{28}$ transmitted from the second voltage monitoring circuit 28 is not reached the target voltage value (not more than the voltage $V_{35}$), the USB-PD controller 10 returns the processing to Step S5. Conversely, as a result of determination executed in Step S6, if the value of the measured value signal $V_{28}$ transmitted from the second voltage monitoring circuit 28 is reached to the target voltage value (not more than the voltage $V_{S5}$ in this case), the USB-PD controller 10 controls the second discharge circuit 24 to stop the reduction in the output voltage of the power source 12 in Step S8. In response to the above control, the second discharge circuit 24 stops the reduction in the output voltage of the power source 12 (at time t21 shown in FIG. 5).

As a result of the determination in Step S6, the timer circuit 32 keeps the processing for turning ON the switch 6 waiting for a predetermined period (the time period t3-t2 shown in FIG. 2), when the value of the measured value signal $V_{26}$ transmitted from the first voltage monitoring circuit 26 is reached to the target voltage value (not more than the voltage $V_{S0}$ in this case), as a trigger, in Step S9.

After the lapse of the predetermined time period, the timer circuit 32 controls the switch driver 4 to turn ON the switch 6, in Step S10. In response to the above control, the switch driver 4 transmits a signal $SW_{ON}$ for turning ON the switch 6, to the switch 6. As a consequence, the switch 6 is turned ON, thereby restarting the power supply to the power line VBUS from the power source 12 (at time t3 shown in FIGS. 2 and 5). Although there is observed a waveform in which the power source output voltage $V_O$ is reduced up to $V_{SP}$ at time t3, such a waveform is a waveform associated with a transient phenomenon that an accumulated charge of the output capacitor $C_p$ in the power source 12 is discharged to the output capacitor $C_O$ of the VBUS line, accompanying the on-operation of the switch 6. The voltage variation value during the time period t3-t4 of the transient phenomenon is equal to or less than several mV. Moreover, the time period t3-t4 of the transient phenomenon is also equal to or less than several msec.

After the time t4, in Step S11, the voltage $V_{S5}$ is output to a connection destination through the power line VBUS, after the voltage of the power line VBUS is restored up to the initial value $V_{S5}$.

Note that any one of the processing of Step S3 and the processing of Step S4 may be executed in advance, or both thereof may be simultaneously executed. Moreover, any one of the processing of Step S5 and the processing of Step S7 maybe executed in advance, or both thereof may be simultaneously executed.

As explained above, according to the PD device 1 and the control method thereof according to the embodiment, during the Hard Reset, the power only supplied to the power line VBUS is interrupted from the power source 12, and therefore the power supplied to the control circuit 8 is not interrupted from the power source 12. Accordingly, since it is not necessary to prepare/use any alternative power source of different system, etc., thereby preventing increase in the size and cost of the PD device.

According to the embodiment, there can be provided the PD device capable of achieving protocols, e.g. Hard Reset, without using any alternative power source, and the control method of such a PD device.

OTHER EMBODIMENTS

As explained above, the embodiment has been described, as a disclosure including associated description and drawings to be construed as illustrative, not restrictive. This disclosure makes clear a variety of alternative embodiments, working examples, and operational techniques for those skilled in the art.

Such being the case, the embodiment cover a variety of embodiments, whether described or not.

What is claimed is:

1. A power delivery device comprising:
   a power source;
   a power line configured to deliver power supplied from the power source, to an outside;
   a switch connected between the power source and the power line; and
   a control circuit connected to the power line so that power is supplied from the power source to the control circuit, wherein
   at the time when a Hard Reset protocol is received from the outside through the power line, the control circuit turns from ON to OFF the switch to disconnect the power line from the power source.

2. The power delivery device according to claim 1, wherein
   the power is supplied from the power source to the control circuit regardless of turning ON/OFF of the switch.

3. The power delivery device according to claim 1, further comprising:
   a timer circuit configured to control timing of the ON/OFF operation of the switch; and
   a switch driver configured to turn ON/OFF the switch in response to the control by the timer circuit.

4. The power delivery device according to claim 1, further comprising:
   a first discharge circuit configured to reduce a voltage of the power line, wherein
   after turning from ON to OFF the switch, the first discharge circuit reduces the voltage of the power line is reduced up to a first target voltage value.

5. The power delivery device according to claim 4, further comprising:
   a first voltage monitoring circuit configured to monitor the voltage value of the power line, wherein
   the control circuit controls discharge processing of the first discharge circuit on the basis of the voltage value of the power line transmitted from the first voltage monitoring circuit.

6. The power delivery device according to claim 1, further comprising:
   a second discharge circuit configured to reduce an output voltage of the power source, wherein
   after turning from ON to OFF the switch, the second discharge circuit reduces the output voltage of the power source up to a second target voltage value.

7. The power delivery device according to claim 6, further comprising:
   a second voltage monitoring circuit configured to monitor the output voltage value of the power source, wherein
   the control circuit controls discharge processing of the second discharge circuit on the basis of the output voltage value of the power source transmitted from the second voltage monitoring circuit.

8. The power delivery device according to claim 4, wherein
   the timer circuit keeps the timing for turning ON the switch waiting for a predetermined period, when the voltage of the power line is reached to the first target voltage value into a trigger, as a trigger.

9. The power delivery device according to claim 8, wherein
   the timer circuit controls the timing for turning ON the switch on the basis of the voltage value of the power line transmitted from the first voltage monitoring circuit.

10. The power delivery device according to claim 1, wherein
    the control circuit is a USB power delivery controller, and the power line is a power line used for a USB power delivery.

11. The power delivery device according to claim 1, further comprising:
    an inductance connected between the power source and the power line.

12. The power delivery device according to claim 11, wherein the switch is connected between the power source and the inductance.

13. The power delivery device according to claim 1, wherein
the control circuit is connected to the power line through the capacitor.

14. The power delivery device according to claim 1, wherein the power source comprises:
a DC/DC converter disposed between an AC input and a DC output, the DC/DC converter composed of a transformer, a diode, a capacitor, and a MOS transistor, the MOS transistor connected in series between a primary-side inductance of the transformer and a ground potential;
a first control unit configured to control the MOS transistor;
an AC/DC converter connected between the AC input and the first control unit, the AC/DC converter configured to supply power to the first control unit;
a second control unit for error compensation connected between the output of the DC/DC converter and the DC output; and
an insulation circuit connected to the second control unit, the insulation circuit configured to feed back output information to the first control unit.

15. The power delivery device according to claim 6, wherein
the second discharge circuit is built in any one of the power source and the second voltage monitoring circuit.

16. A control method of a power delivery device, the power delivery device comprising: a power source; a power line configured to deliver power supplied from the power source, to an outside; a switch connected between the power source and the power line; and a control circuit connected to the power line so that power is supplied from the power source to the control circuit, the control circuit configured to control the power delivery device, the control method comprising:

turning from ON to OFF the switch to disconnect the power line from the power source, at the time when a Hard Reset protocol is received from the outside through the power line; and
reducing a voltage of the power line up to a first target voltage value, after turning from ON to OFF the switch.

17. The control method of the power delivery device according to claim 16, comprising:
reducing an output voltage of the power source up to a second target voltage value after turning from ON to OFF the switch;
keeping the timing for turning ON the switch waiting for a predetermined period, when the voltage of the power line is reached to the first target voltage value into a trigger, as a trigger; and
turning ON the switch after the lapse of the predetermined time period.

18. The control method of the power delivery device according to claim 16, wherein
the power is supplied from the power source to the control circuit regardless of turning ON/OFF of the switch.

19. The control method of the power delivery device according to claim 16, wherein
the power delivery device further comprises a timer circuit configured to control timing of the ON/OFF operation of the switch, wherein
the switch is turned ON/OFF in response to the control by the timer circuit.

20. The control method of the power delivery device according to claim 16, wherein
the power delivery device further comprises a first discharge circuit configured to reduce a voltage of the power line, wherein
after turning from ON to OFF the switch, the first discharge circuit reduces the voltage of the power line is reduced up to a first target voltage value.

* * * * *